Nov. 12, 1935.    R. FALCONER ET AL    2,021,055
GAS PRODUCING APPARATUS
Filed Dec. 1, 1933    3 Sheets-Sheet 1
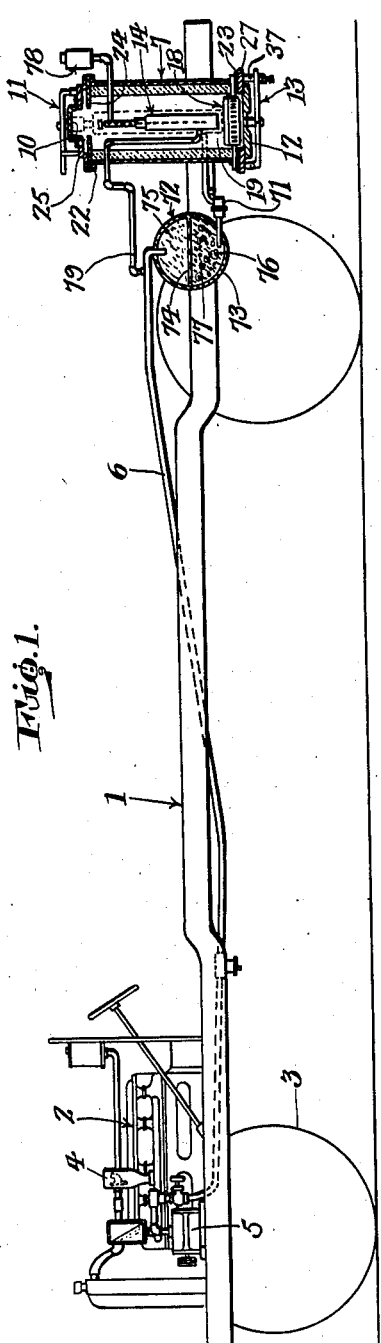
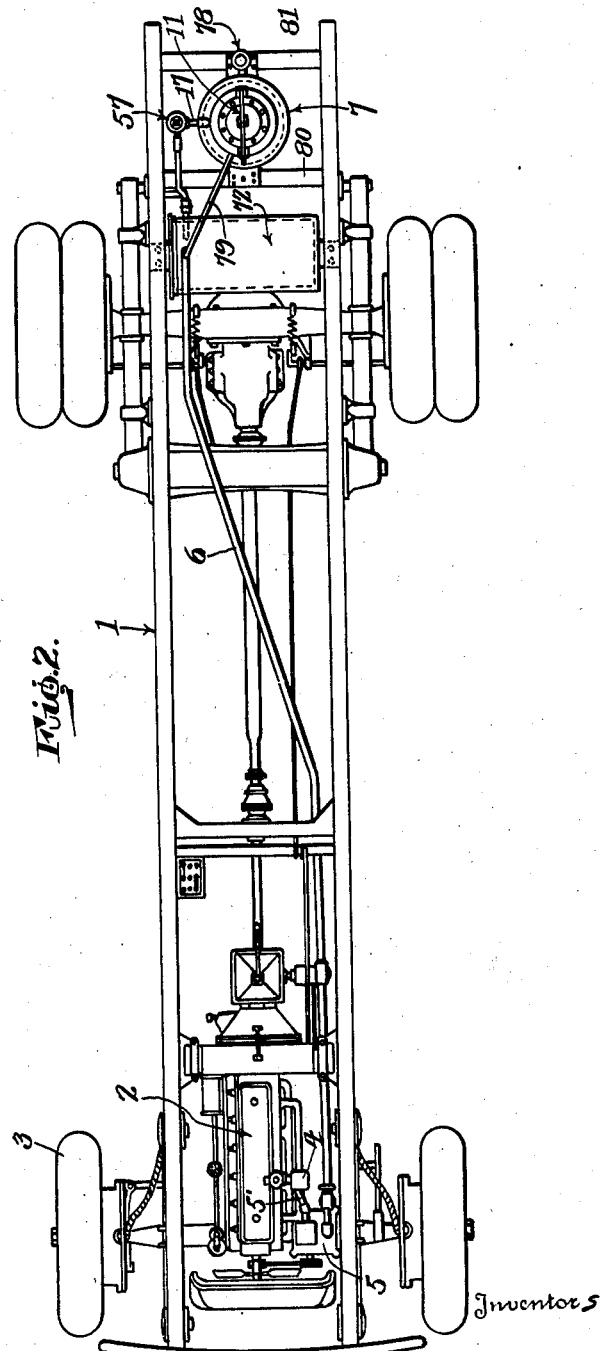
Inventors
Robert Falconer
Edvardo Collignon
By Geo. P. Kimmel
Attorney Nov. 12, 1935.  R. FALCONER ET AL  2,021,055
GAS PRODUCING APPARATUS
Filed Dec. 1, 1933  3 Sheets-Sheet 2
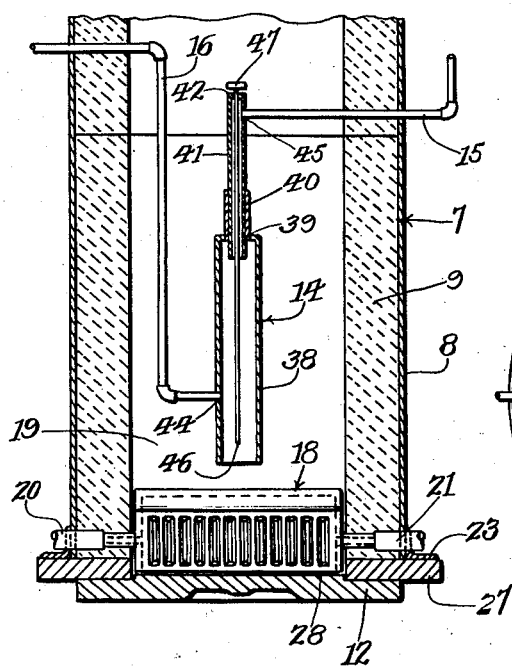
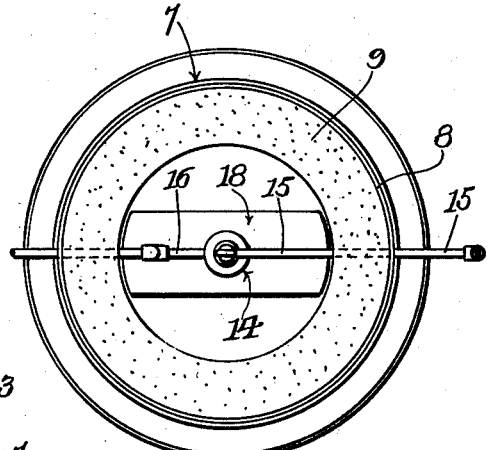
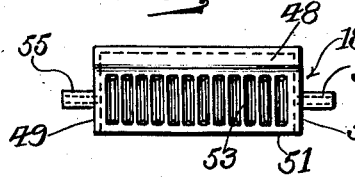
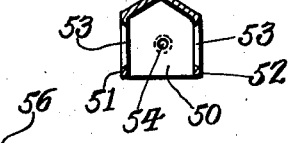
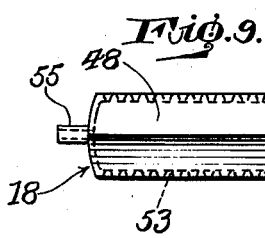
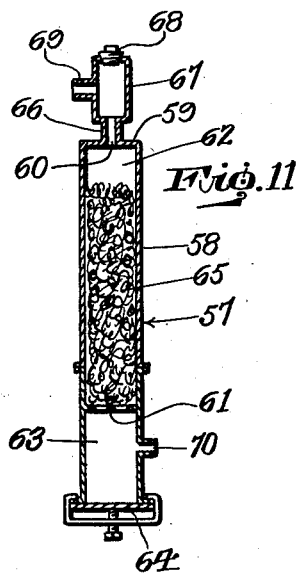
Inventors
Robert Falconer
Edvardo Collignon
By Geo. P. Kimmel
Attorney Nov. 12, 1935.   R. FALCONER ET AL   2,021,055
GAS PRODUCING APPARATUS
Filed Dec. 1, 1933   3 Sheets-Sheet 3

Inventors
Robert Falconer
Edvardo Collignon

By Geo. P. Kimmel
Attorney

UNITED STATES PATENT OFFICE 2,021,055

GAS PRODUCING APPARATUS

Robert Falconer and Eduardo Colligson, Guadalajara, Mexico

Application December 1, 1933, Serial No. 700,628
In Mexico May 10, 1933

6 Claims. (Cl. 48—118.5)

This invention relates to a gas producing apparatus for making combustible gas chiefly for use with automotive vehicles, and has for its object to provide, in a manner as hereinafter set forth, an apparatus of the class referred to having as a part thereof a generator element including a vertical grate structure set up in a manner to overcome sifting with respect to the fuel and further for a satisfactory circulation of air during the gas forming operation.

A further object of the invention is to provide, in a manner as hereinafter set forth, an apparatus of the class referred to including means for the generating of high and low grades of gas and for mixing the grades prior to the delivery thereof to a point of consumption.

A further object of the invention is to provide, in a manner as hereinafter set forth, an apparatus of the class referred to having as a part thereof a generator element constructed in a manner to make it unusually desirable, capable of being conveniently repaired, expeditiously cleaned and dismantled when occasion requires.

A further object of the invention is to provide, in a manner as hereinafter set forth, an apparatus of the class referred to including as a part thereof a generator structure for generating gas of different grades independently discharged therefrom, and after discharge capable of being mixed together prior to the delivery thereof to a point of consumption.

Further objects of the invention are to provide, in a manner as hereinafter set forth, an apparatus for the purpose referred to, which is comparatively simple in its construction and arrangement, strong, durable, compact, readily installed with respect to an automotive vehicle, thoroughly efficient for the purpose intended thereby, readily repaired, and comparatively inexpensive to set up.

To the above ends essentially and to others which may hereinafter appear, the invention consists of such parts, and such combination of parts which fall within the scope of the invention as claimed.

In the drawings:

Figure 1 is a side elevation of an automotive vehicle showing the adaptation therewith of the gas producing apparatus.

Figure 2 is a top plan view of the automotive vehicle with the gas producing apparatus installed therewith.

Figure 3 is a fragmentary view in vertical section of the gas-generator-structure.

Figure 4 is a sectional plan of the gas-generator-structure showing the supply and discharge pipes respectively extending to and leading from said structure.

Figure 8 is a side elevation of the grate element.

Figure 9 is a top plan view of the grate element.

Figure 10 is a transverse section of the grate element.

Figure 11 is a vertical sectional view of the filter element for the low grade gas.

Figure 5:
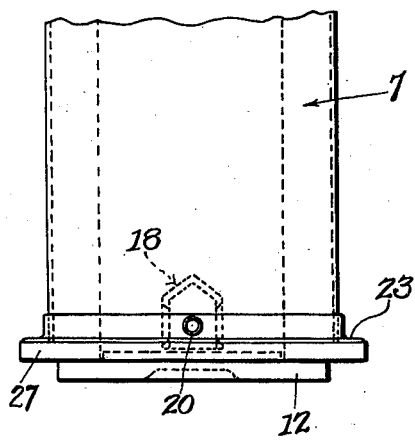
Figure 5 is a fragmentary view in elevation of the gas-generator-structure.
Figure 6:
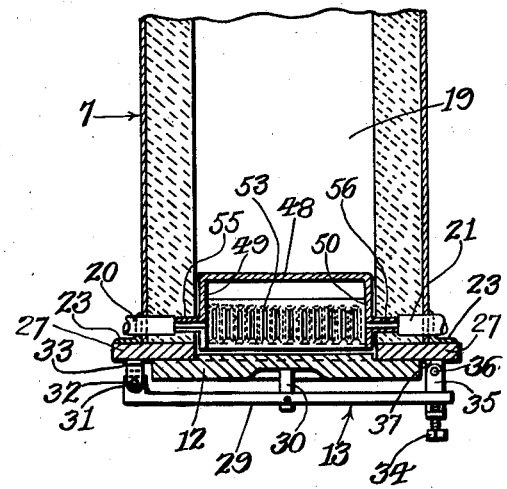
Figure 6 is a fragmentary view in vertical section of the gas-generator-structure taken at right angles to Figure 3.
Figure 7:
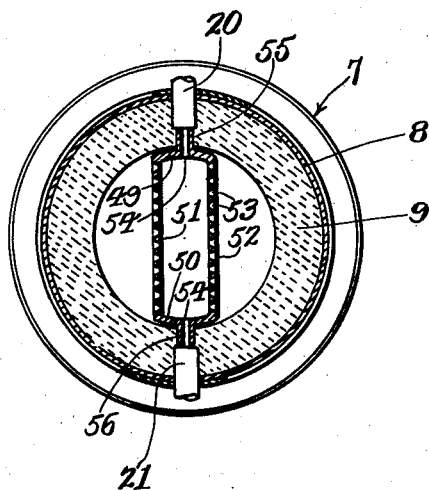
Figure 7 is a cross sectional view of the gas-generator-structure taken at a point through the grate element.

Referring to the drawings, 1, 2, and 3 indicate generally the chassis, propulsion structure and wheels respectively of an automotive vehicle. The structure 2 includes a carburetor 4.

Supported from chassis 1 is a pump 5 for forcing a combustible mixture through a conducting pipe 5' to the carburetor 4. Leading to the pump 5 is a combustible mixture supply line 6.

The apparatus, in accordance with this invention, may or may not have the pump 5 form a part thereof, and when the pump is not used the line 6 is adapted to be coupled directly to carburetor 4. The line 6 extends forwardly from the rear end portion of chassis 1.

The apparatus includes a gas-generator structure indicated generally at 7 and formed of an annular shell 8 of the desired diameter and height, a lining of refractory material 9 for shell 8, a removable lid 10 for the latter, holdfast means 11 for removably securing the lid in closed position, a removable closure 12 for the bottom of shell 8, holdfast means 13 for removably securing the closure in position, a retort 14 suspended within shell 8 and spaced from lining 9, a supply pipe 15 extending through the body and lining of shell 8 and communicating with the retort, an off-take pipe 16 for high grade gas leading from the retort 14 and extending outwardly through the body and lining of shell 8, an off-take pipe 17 for low grade gas extending outwardly from the lid 10, a substantially oblong tuyère element 18 arranged within the lower portion of a cylindrical generating chamber 19 provided by the lining 9, lid 10, a closure 12 supported upon the latter, and oppositely disposed air supply pipes 20, 21 extending through the lower portion of the lining and body of the shell 8 and opening into the tuyère element 18. The lid 10 is of inverted cup-shape. The length of element 18 corresponds to the diameter of chamber 19. Solid and liquid fuels are employed for generating high and low grades of gas in chamber 19. The high grade gas is conducted off independently of the low grade gas, after which the gases are mixed to obtain a rich gas mixture. The shell 8 has its upper and lower ends formed with laterally extending annular flanges 22, 23 respectively. Seated upon the top edge of lining 9 and the flange 22, as well as being secured to the latter is a flat annulus 24. Secured upon the latter is an annular member 25 of angle-shaped contour in cross section. The lid 10 is positioned upon the member 25 and in connection with the annulus 24 and member 25 provides a pocket into which opens the pipe 17. Secured against the flange 23 is a flat annulus 27 against which is positioned the closure 12. The latter is formed with a circular upstanding portion 28 which extends into the annulus 27.

The holdfast means 11 and 13 are of like form and each consists of a latching bar 29 having pivotally connected thereto intermediate the ends thereof a clamp 30. One end of bar 29 is formed with an extension 31 disposed at right angles thereto, and which is pivotally connected as at 32 to a bracket 33. The other end of bar 29 is mounted upon a binding screw 34 carried by one end of an angle-shaped bracket 35 pivotally connected as at 36 to a lug 37. The bracket 33 and lug 37 of the holdfast means 11 are fixed to the member 24 and extend upwardly therefrom. The bracket 33 and lug 37 of the holdfast means 13 are fixed to the annulus 27 and depend therefrom. The clamps 30 of the holdfast means 11 and 13 bind respectively against the lid 10 and closure 12. The screws 34 of the said holdfast means bear against the bars 29 for maintaining the clamps 30 in position to tightly hold the lid and closure in closing position with respect to the upper and lower open ends of the casing and lining.

The retort 14 includes a tubular member 38 disposed axially of and suspended in chamber 19. The upper and lower ends of member 38 are spaced from the top and bottom respectively of chamber 19. The upper end of member 38 is formed with an inwardly extending annular flange 39 merging into an upstanding sleeve 40. Extending through the flange 39 and sleeve 40 is a vertical tube 41 secured intermediate its ends to the inner face of sleeve 40. The tube 41, at its upper end, is formed with an inwardly extending annulus flange 42. The lower end of member 38 is positioned above and in proximity to the tuyère element 18. The member 38, adjacent its lower end, is formed with an opening 44. The tube 41, adjacent its upper end, is provided with an opening 45. Suspended within and disposed axially of retort 14 is a wire 46 which extends from above the flange 42 to a point in proximity to the lower end of member 38. The wire 46, at its upper end, is formed with a head piece 47. The retort 14 is suspended in chamber 19 by the pipes or lines 15, 16 secured respectively in the openings 45, 44.

The tuyère element 18 consists of an open bottom hollow casting formed of an inverted V-shaped top 48, a pair of end walls 49, 50 having their upper ends conforming in contour to the shape of top 48 and a pair of rectangular side walls 51, 52 each provided with a series of closely arranged vertically disposed rectangular tapered air discharge slots 53. Each end wall is provided with an opening 54. Integral with the end walls 49, 50 are air inlet nipples 55, 56 respectively which communicate with the openings 54 and extend into the lining 9. The nipples 55, 56 also extend into the air supply pipes 20, 21 respectively. As the nipples 55, 56 are encompassed by lining 9 the element 18 is anchored in the lower portion of chamber 19. The end walls of element 18 are rounded to conform to the shape of the wall of chamber 19.

Arranged adjacent the structure 7 is a combined gas receiver and filter element 57 consisting of a vertically disposed open bottom casing 58 having a top 59 formed with an axial opening 60. Arranged within casing 58 beween its transverse median and open lower end is a perforated partition 61 providing in connection with the body of casing 58 an upper filtering chamber and a lower filtered gas receiving chamber 62, 63 respectively. The lower end of casing 58 is sealed by a removable closure 64. The chamber 62 has arranged therein a filtering medium 65 supported by partition 61. Integral with the top 59 and registering with opening 60 is a tubular extension 66 which opens into a gas intake head 67 provided with a removable plug 68 to permit of access thereto. The head 66 is formed with an intake nipple 69 to which the gas off-take pipe or line 17 leading from the upper end of chamber 19 is attached. The casing 58 is formed with an outlet nipple 70 for chamber 63 to which is attached a gas off-take pipe or line 71. The element 57 is suspended by the pipes 17, 71 and nipples 69, 70.

Arranged forwardly of the structure 7 is a combined gas collector and filter element 72 comprising a horizontally disposed closed casing or cylinder 73 having therein an apertured partition 74 to form casing 73 with an upper gas collecting chamber 75 and a lower gas filtering chamber 76. The supply line 6 opens into the top of the chamber 75. The line or pipe 71 opens into the chamber 76 at the bottom of the latter and also extends into a body of a filtering medium 77 arranged in chamber 76.

The pipe 15 leads from a source 78 of liquid fuel. The pipe 16 opens into a pipe 79 which communicates with the line 6 forwardly of that end of the latter which opens into chamber 75. The structure 7 is supported by a pair of spaced cross members 80, 81 at the rear of the chassis 1. The fuel source 78 is arranged over member 81 and may be supported therefrom. The element 72 is supported from the side bars of the chassis 1.

Solid fuel to be burned is positioned on element 18.

The liquid fuel from source 78, which is to be vaporized, is slowly fed through pipe 15 by gravity and when it reaches retort 14, it is made to slide down on the surface of wire 46. The lower end of the latter is maintained incandescent from the heat of the solid fuel being burned on the grate element. The air necessary to support combustion enters through the pipes 20, 21. The pipe 16 serves to withdraw the lighter and more volatile components of the liquid fuel from retort 14. The pipe 16 is also maintained incandescent from the heat of the solid fuel being burned and it also serves to convert the gasified components of the liquid fuel being withdrawn from retort 14 into a more or less permanent gaseous condition. The gas conducted off by pipe 16 is the higher grade. The gas of lower grade is conducted off by pipe 17 and is filtered twice, after which it is mixed with the high grade gas, due to the opening of pipe 79 into line 6. By this arrangement a richer gas mixture is provided for feeding to the motor or engine.

By having the lower end of retort 14 open, the tendency for carbon to form in the retort is prevented. Even though there may be a tendency for small bits of carbon to form at the lower end of the retort, this is prevented by wire 46 which vibrates with the vibration of the vehicle to such an extent to serve as a cleaner for the bottom of the retort in addition to serving as a conductor for the liquid fuel.

The top of the tuyère element 18, as formed in the manner hereinbefore referred to, provides for the sliding off therefrom of the residue combustion. The element 18 is disposed at the diametrical center of the bottom of chamber 19. The air supplied for combustive purposes is had through the sides of element 18 whereby the circulation of the air is not prevented.

The residue of the liquid fuel fed to the retort 14 drops toward the open fire on element 18 through the lower open end of the retort. The liquid fuel, such as crude oil and the solid fuel such as charcoal or coal when combined will generate the poor grade of gas which will be conducted off by pipe 17. The wire 46 in connection with the pipe 16, casing 38 and heat from the combustible mass in element 18 will generate from the liquid fuel supplied to retort 14 a higher grade of gas than that generated from the solid fuel and the residue of the liquid fuel.

The construction of the gas-generator-structure 7 permits of it to be readily cleaned when occasion requires, due to the manner of setting up the closure 12 and the holdfast means 13 for the latter.

What we claim is:—

1. In an apparatus for producing high and low grade gases from liquid and solid fuel, a structure providing a cylindrical gas generating chamber, including a top and an imperforate bottom, a horizontally disposed substantially oblong hollow tuyère element seated on said bottom at the diametric center of the latter for supporting solid fuel and including an imperforate bottom, an imperforate top sloping in opposite directions throughout its lengthwise median, a pair of sides formed with outlets and a pair of ends formed with oppositely extending air intakes anchored in said structure at diametrically opposite points with respect to said chamber, a vertically disposed open bottom tubular retort disposed at the axis of said chamber, said retort formed with an axially apertured top and having its bottom arranged in close proximity to the top of said element, a vertically disposed liquid fuel conduit anchored to and having its lower portion extending through the opening at the top of said retort, a liquid fuel feed pipe supported by said structure and opening into the upper portion of said conduit, a high grade gas take-off pipe leading from said retort and anchored in said structure, said pipes suspending the retort within said chamber, and a lower grade take-off pipe at the upper portion of said chamber.

2. In an apparatus for producing high and low grade gases from solid and liquid fuel, a vertically disposed gas generating chamber including a top and a bottom, a hollow tuyère element seated upon said bottom, and of less width than that of said chamber, said element for supporting solid fuel, having an imperforate top sloping in opposite directions throughout from its lengthwise median, air outlets in its sides and air intakes at its ends extended from said chamber, an open bottom upstanding tubular retort arranged axially of said chamber, positioned in proximity to the top of said element and formed with a top having an axial opening, an upstanding liquid fuel conduit extending through said opening into the retort, a liquid fuel feed pipe opening into the upper portion of said conduit, a high grade gas take-off pipe leading from said retort, and a low grade take-off pipe leading from the upper end of said chamber.

3. An apparatus for producing high and low grade gases from solid and liquid fuel of the construction set forth in claim 2, the combining with the retort and liquid fuel conduit a wire extending downwardly through the conduit into the retort to a point in proximity to and above the lower end of the retort, the wire being extended above the conduit, having a head at its upper end and disposed axially of the conduit and retort.

4. In an apparatus for producing high and low grade gases from liquid and solid fuels and of that type including a gas generating chamber having arranged therein a tuyère element for supporting solid fuel, the combination of an upstanding tubular retort for the liquid fuel adapted to be arranged axially of the gas generating chamber, said retort having an open bottom adapted to be positioned in proximity to the top of the tuyère element and a top formed with an axial opening, an upstanding liquid fuel conduit anchored to said retort, extending through said opening and discharging into the upper portion of the retort, said conduit including a top having an axial opening, and a liquid fuel line opening into the conduit in proximity to the top therein.

5. In an apparatus for producing high and low grade gases from liquid and solid fuels and of that type including a gas generating chamber having arranged therein a tuyère element for supporting solid fuel, the combination of an upstanding tubular retort for the liquid fuel adapted to be arranged axially of the gas generating chamber, said retort having an open bottom adapted to be positioned in proximity to the top of the tuyère element and a top formed with an axial opening, an upstanding liquid fuel conduit anchored to said retort, extending through said opening and discharging into the upper portion of the retort, said conduit including a top having an axial opening, a liquid fuel line opening into the conduit in proximity to the top therein, a wire extending down through said conduit and retort to a point above and in proximity to said open bottom, said wire being spaced from the walls of the conduit and retort, extended above the conduit and formed with a head.

6. In a gas apparatus for producing high and low grade gases for mixing together, a vertically disposed hollow structure providing an upstanding cylindrical gas generating chamber closed at its top and bottom, a hollow oblong tuyère element disposed diametrically of the bottom of said chamber and closed at its top and bottom, said element having air outlets in its sides and laterally extending air intakes at its ends anchored in said structure, said element for supporting a solid fuel, an upstanding liquid fuel retort having an open bottom positioned in proximity to the top of said element, said retort being suspended within said chamber axially thereof, a liquid fuel conduit anchored to and extending into the upper portion of said retort, a liquid fuel feed pipe opening into the upper portion of said conduit and anchored on said structure, a high grade gas take-off pipe leading from the lower portion of said retort and anchored in said structure, and a low grade gas take-off pipe leading from the upper portion of said chamber and anchored to said structure.

ROBERT FALCONER.
EDUARDO COLLIGNON.